(12) United States Patent
Jachmann

(10) Patent No.: US 7,705,720 B2
(45) Date of Patent: Apr. 27, 2010

(54) SELF LEVELING WARNING LIGHT FOR VEHICLES

(75) Inventor: Emil F. Jachmann, West Springfield, MA (US)

(73) Assignee: Cyalume Technologies, Inc., West Springfield, MA (US)

( * ) Notice: Subject to any disclaimer, the term of this patent is extended or adjusted under 35 U.S.C. 154(b) by 279 days.

(21) Appl. No.: 12/013,949

(22) Filed: Jan. 14, 2008

(65) Prior Publication Data

US 2009/0179750 A1 Jul. 16, 2009

(51) Int. Cl.
*B60Q 7/00* (2006.01)

(52) U.S. Cl. .................. 340/473; 340/471; 340/468; 340/469; 362/459; 362/496; 362/555

(58) Field of Classification Search ........... 340/473, 340/471, 458, 459; 362/459, 496, 555
See application file for complete search history.

(56) References Cited

U.S. PATENT DOCUMENTS

| 3,936,671 | A | * | 2/1976 | Bobrick et al. | 362/459 |
|---|---|---|---|---|---|
| 4,370,813 | A | * | 2/1983 | Burniski | 33/291 |
| 4,449,167 | A | * | 5/1984 | Cohen | 362/269 |
| 4,651,129 | A | * | 3/1987 | Wood et al. | 340/479 |
| 4,858,082 | A | | 8/1989 | Hayward | |
| 4,949,071 | A | | 8/1990 | Hutchison | |
| 4,981,363 | A | * | 1/1991 | Lipman | 362/503 |
| 4,993,161 | A | * | 2/1991 | Borkovitz | 33/291 |
| 5,272,602 | A | | 12/1993 | Sasajima | |
| 5,317,487 | A | * | 5/1994 | Su | 362/504 |
| 5,490,046 | A | | 2/1996 | Gohl | |
| 5,587,795 | A | * | 12/1996 | Williams | 356/432 |
| 5,595,441 | A | | 1/1997 | McGee | |
| 5,934,798 | A | | 8/1999 | Roller | |
| 6,161,809 | A | * | 12/2000 | Mahy et al. | 248/396 |
| 6,203,181 | B1 | | 3/2001 | Gross | |
| 7,036,965 | B2 | | 5/2006 | Dalton | |
| 7,080,930 | B2 | | 7/2006 | Pederson | |
| 7,106,185 | B1 | | 9/2006 | Neufeglise | |
| 7,158,020 | B2 | | 1/2007 | Grady | |
| 7,195,385 | B2 | | 3/2007 | Zimmermann | |
| 2002/0154512 | A1 | | 10/2002 | Shy | |
| 2003/0016543 | A1 | | 1/2003 | Akiyama | |

* cited by examiner

*Primary Examiner*—Daniel Wu
*Assistant Examiner*—Son M Tang
(74) *Attorney, Agent, or Firm*—McHale & Slavin, P.A.

(57) ABSTRACT

A self leveling warning light for vehicles employing a light assembly that is pivotedly secured to an inner surface of a vehicle window by a mounting base suction cup. The light assembly has a plurality of LEDs whose intensity is amplified by a reflector and focused by an optical lens providing light emission in distances exceeding one mile with minimal battery drain. A control circuit having a power source is mounted within said light assembly and electrically coupled to the LEDs, the control circuit controlling four red LEDs separated by a centrally located yellow LED, the four red LEDs alternate on and off at sync rate of approximately 500 ms and the yellow LED turns on for about 750 ms and off for about 1 second. The light assembly maintaining directional pointing of the LEDs in a horizontal plane when the mounting base is moved between vertical and horizontal orientations by gravity weighting of the light assembly.

11 Claims, 3 Drawing Sheets

SELF LEVELING WARNING LIGHT FOR VEHICLES

FIELD OF THE INVENTION

The present invention relates to warning light devices, and particularly to a warning light device that is attached to the inner surface of a vehicle window to provide a warning for approaching traffic.

BACKGROUND OF THE INVENTION

The use of warning lights is well known to indicate the stoppage of a vehicle or need of assistance. Such a warning light properly placed provides protection of people against injury such as a flashing light or flare would indicate an emergency situation. Conventionally, flares have been used and have an advantage of being easily visible at night. However, a flare is an incendiary device and is very dangerous at night especially to those that are untrained should the vehicle mishap include a spillage of gasoline. For this and other reasons, the use of a flare and its storage problems as well as disposal problems have been all but eliminated by the use of high intensity lighting that can be effectuated by the use of LED lamps. A properly pointed LED, which is a directional lighting device, can provide as strong as, if not stronger, lighting as a flare without the associated ignition and/or storage problems. One of the problems with the use of LED lights is that it is a directional lighting device and if not properly pointed provides little or no warning ability. For instance, if the LED light is pointed upwardly at a 45° angle it would be barely noticeable from a distance. However, if the LED light was pointed directly toward the approaching vehicle, the vehicle could easily spot the LED from over a mile away.

There is known prior art for the use of LED's, but as previously stated, unless the LED is properly situated it provides little or no benefit. A problem with properly situating the light is that during an emergency, an individual may not take the time to align the light or understand the need for aligning the light to provide the proper warning. Thus what is needed is a lighting device capable of attaching to a vehicle and automatically aligning itself with the horizon to provide the most effective warning indicator that can be viewed from the longest distance.

Publication No. 2002/0154512 discloses a warning light device including one or more suckers each having a housing extended from the rear portion for receiving one or more light bulbs which may be coupled together with electric wires. One or more batteries may be coupled to the light bulbs to generate the warning light through the sucker. One or more integrated circuits may be coupled to the light bulbs to energize or control the light bulbs simultaneously or alternatively. A cover may be engaged onto the housing for retaining the light bulb in the housing of the sucker.

U.S. Pat. No. 7,080,930 discloses a light emitting diode (LED) warning signal light, comprising a plurality of light sources constructed and arranged with a reflector or cullminator, the LED light sources being in electrical communication with a controller and an electrical source. The warning signal light provides various colored light signals for independent use or by an emergency vehicle. These light signals may include a strobe light, revolving light, an alternating light, a flashing light, a modulated light, a pulsating light, an oscillating light or any combination thereof. Additionally, the warning signal light may be capable of displaying symbols, reverse characters, or arrows. The controller may further be adapted to regulate or modulate the power intensity exposed to the illuminated LED's to create a variable intensity light signal.

U.S. Pat. No. 6,203,181 discloses a car locator comprising a base for attaching the locator to a car. A cantilevered support bar is pivotally connected with the base to permit pivotal movement and positioning of the bar relative to the base. The support bar is illuminated by a series of LEDS mounted on the support bar and connected to a power source and an optional switch, which may be mounted directly on the base, via electrical conductors. The power source may include batteries mounted to or contained within the base.

U.S. Pat. No. 4,449,167 discloses an auxiliary safety rear light assembly for vehicles which can be adhesively mounted at any position on the rear window of a vehicle or which can be adjusted along a horizontal axis so as to be mountable parallel to the road regardless of the angle which the vehicle rear window makes to the road.

U.S. Pat. No. 4,949,071 discloses a vehicle communication device wherein a display unit is selectively mountable onto a rear shelf of an automobile adjacent a rear window, including a safety switch to automatically de-energize the display unit when improperly oriented relative to the rear window. Suspension hooks are further included for selectively securing the display unit from rear or side windows of the automobile.

U.S. Pat. No. 4,858,082 discloses a visor-mountable emergency light system including a housing to be mountable to and carried by a vehicle sunvisor. One or two portions of the housing have a conformation receptive of a strobotron exposed for directing light outwardly away from the housing. Another portion of the housing is conformed to define a cavity within which is located a firing unit mounted and connected to cyclically ignite the strobotron. The strobotron includes a light-transmissive lens that has a central area which transmits light of one or more specific colors and a peripheral area which transmits at least primarily uncolored light.

U.S. Pat. No. 5,272,602 discloses a pair of conductive patterns, which are to be electrically connected to the battery of a motor vehicle, which are formed by baking on the interior surface of the rear windowpane of the vehicle. A pair of nuts or brackets of electrically conductive material are soldered to the conductive patterns. The lamp body of a supplemental high mounted stop lamp are fastened to the nuts or brackets, with the light sources of the lamp electrically connected in circuit therewith.

U.S. Pat. No. 5,317,487 discloses a vehicle warning light assembly including an elongated hollow casing having an open front, a lamp unit extending longitudinally between two sides of the casing adjacent to the open front, a wheel member that is mounted rotatably in the casing on one of the two sides of the casing, an elongated reflector plate which is disposed in the casing on one side of the lamp unit and which has one end secured to the wheel member, a driving mechanism which is activatable to rotate the wheel member to rotate correspondingly the reflector plate around the lamp unit, and a transparent pane that is mounted on the casing at the open front of the casing.

U.S. Pat. No. 5,934,798 discloses a lamp assembly for illumination of a vehicle license plate including a substrate, a plurality of LED's mounted on the substrate, and a lens for directing the light emitted from the LED's onto the license plate. A housing encases the substrate and the lens. An attachment member fixedly secures the housing to a vehicle displaying the license plate.

U.S. Pat. No. 7,036,965 discloses a light bar containing one or more rows of light-emitting diodes (LED's) in a housing which extends across substantially the entire width of a windshield of a vehicle and is narrow in width to minimize interference with visibility through the windshield. The LED's are arranged in banks generally symmetrically arrayed about the center of the length of the housing. Two of the banks, preferably equidistant from the center, are tilted in opposite directions to each other so as to project light toward the right side and left side of the vehicle. A mechanism is provided for displacing and tilting the housing and may use pivotal arms attached to the end of the housing or adjustable Z-shaped hangers attached preferably to clamps such as visor clips already on the vehicle.

U.S. Pat. No. 7,106,185 discloses a full function light bar mounted inside a vehicle against the windshield. The light bar is an assembly of several light sources. The light bar is not limited in application to one specific vehicular model and is adaptable and adjustable to conform to the windshield, rear window, or other interior cab surfaces of varying shape. The light sources are supported on a flexible support mount which has adjustable, flexible gaskets. End caps and the gaskets screen the inside of the vehicle from the light emitted by the light bar. The support mount is hung on adjustable brackets which allow the light bar to be raised, lowered and tilted to further facilitate conformance with the windshield.

U.S. Pat. No. 7,158,020 discloses a warning beacon including a transparent housing, having a triangular shape suggestive of a warning sign, the housing having a front face, a back face, and side edges. A mounting plate is disposed within the housing between the front and back faces, and a plurality of LEDs are supported by the mounting plate, and oriented to provide light in at least a forward direction through the front face.

U.S. Publication No. 2003/0016543 discloses a stop lamp for a vehicle comprising a substrate, a plurality of LED chips, at least one connecting wire and a cover. The substrate has a plurality of openings and a surface that faces towards a panel of a rear window of the vehicle. The substrate has an arrangement for fixing to an inner surface of the panel of a rear window of a vehicle. One LED chip is arranged in each opening on the substrate. The connecting wires are arranged on the substrate and electrically connect the LED chips to one another and to a voltage source. The cover is transparent and provided to protect the LED chips.

U.S. Pat. No. 5,595,441 discloses a safety lighting device which includes a base for attachment to an object and at least one elongated illuminatable section pivotably attached to the base. The elongated illuminatable section includes a light source and an illuminatable tube. The light source is circuitly connectable to an energy source to provide illumination, and the illuminatable tube includes a cylinder of scatter refractive material to refract illumination from the illuminatable tube. Methods for increasing visibility and apparent width are also provided.

U.S. Pat. No. 5,490,046 discloses a portable searchlight including an upper lamp housing, a lower base support unit and a releasable attachment device to attach the base support unit to another surface, such as, the roof of a motor vehicle. The apparatus and lamp housing can be tilted or rotated by remote-control from the interior of the vehicle. The releasable attachment device is such that the apparatus can be secured by a suction cup or by placing the base support unit in a shoe which is anchored to another surface.

U.S. Pat. No. 7,195,385 discloses a vehicle light having at least one vehicle light housing having an open end and configured to be arranged on an inner side of a vehicle. At least one illumination element is arranged in the vehicle light housing. The vehicle part has a light-transmissive area covering the open end of the vehicle light housing, wherein the light-transmissive area allows rays emitted by the illumination element to pass through to the exterior. The vehicle part can be the trunk lid or the exterior rearview mirror of the vehicle. The light-transmissive area is covered with a thick coating making it invisible from the exterior of the vehicle when the illumination element is switched off, such that light emitted by the illumination element passes through the coating when at least one illumination element is switched on.

SUMMARY OF THE INVENTION

The instant invention is a LED based self leveling warning light that is attached to the inner surface of a vehicle window, preferably the rear window. The warning light has a base that is attached to a window by use of suction cups to maintain the base in position. The lighting device is attached to the base by a pivot, the pivot allowing the lighting device to automatically align with the horizon based upon a gravity adjustment. The gravity adjustment is accomplished by the weighting of the lighting device, typically relying upon the use of batteries strategically positioned along a lower portion of the lighting device. In this manner should the rear window be attached to the vehicle in the form of a hatchback, the lifting of the hatchback would not effect the positioning of the light which will maintain its horizontal directional pointing thereby providing rearward warning even if the individual has accessed the vehicle by lifting of the hatch.

The light assembly has a plurality of LEDs whose intensity is amplified by a reflector and focused by an optical lens providing light emission in distances exceeding one mile with minimal battery drain. A control circuit having a power source is mounted within said light assembly and electrically coupled to the LEDs, the control circuit controlling four red LEDs separated by a centrally located yellow LED, the four red LEDS alternate on and off at sync at approximately 500 ms and the yellow LED turns on for about 750 ms and off for about 1 second. The light assembly maintaining directional pointing of the LEDs in a horizontal plane when the mounting base is moved between vertical and horizontal orientations by gravity weighting of the light assembly.

Thus an objective of the instant invention is to provide a self-leveling warning light for use with vehicles.

Still another objective of the instant invention is to disclose the use of a self-leveling warning light that can be attached by use of a suction cup to the inner surface of a vehicle window.

Still another objective of the instant invention is to disclose the use of strategically mounted batteries so as to provide a weighted lighting device capable of maintaining a directional lighting effect despite the angular positioning of vehicle window.

Still another objective of the instant invention is to disclose the use of a weighted lighting device capable of maintaining a directional lighting whether the window is in a vertical plane or rotated into a horizontal plane, or any angle in between.

Still another objective of the instant invention is to eliminate the need for aligning of a warning device in an emergency situation.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objectives and features thereof.

DETAILED DESCRIPTION OF THE PREFERRED EMBODIMENT

Figure 1:
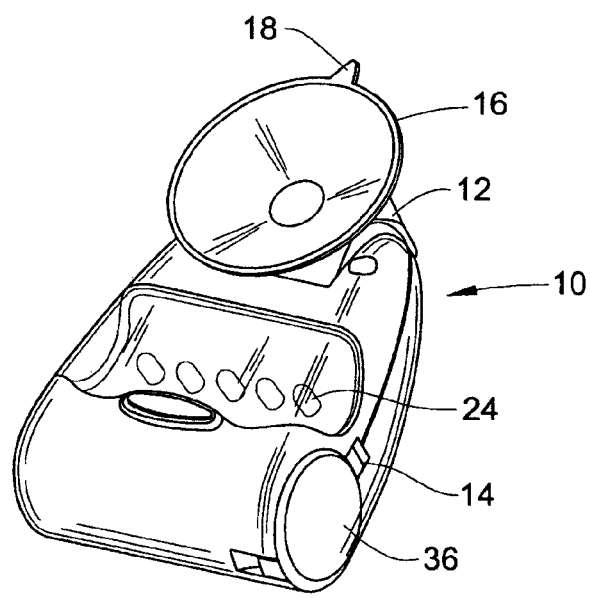
FIG. 1 is a perspective view of the self-leveling device of the instant invention.

Referring now to FIG. 1, set forth is the self-leveling warning light (10) having a mounting base (12) and a light assembly (14). The mounting base includes a suction cup (16) that is releaseably secured to the inner surface of a vehicle window. Suction cup includes a pull tab (18) that allows for ease of removal from a window attachment by lifting of the tab (18) and allowing air to enter the suction area. The mounting base (12) is pivotally attached to the light assembly allowing the light assembly to rotate in relation to the mounting base. The light assembly is further defined by an upper end (20) and a lower end (22) with a plurality of LED's (24) positioned therebetween. The upper end (20) is pivotally attached to the mounting base (12).

Figure 2:
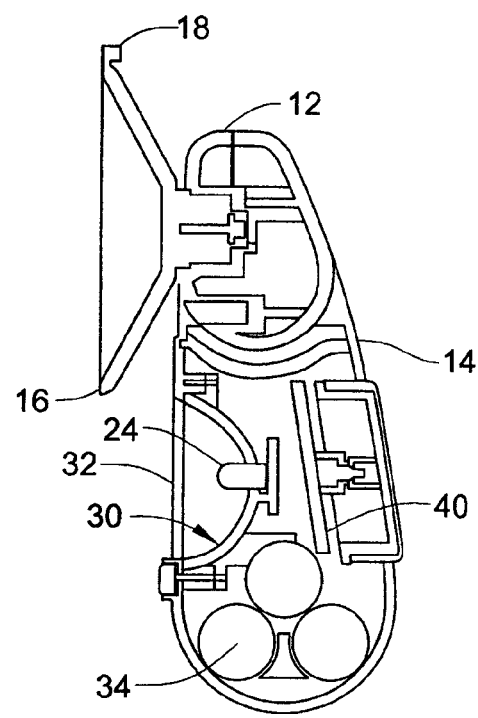
FIG. 2 is a cross sectional side view.
Figure 3:
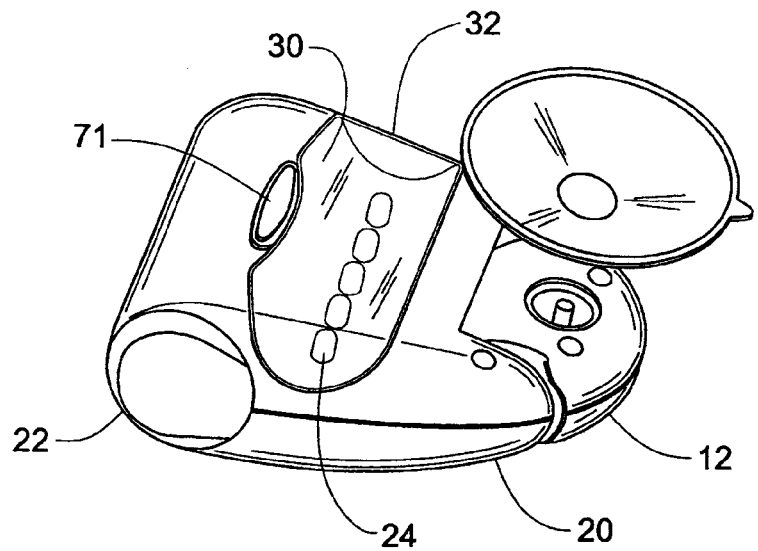
FIG. 3 is a perspective view with the battery compartment opened.

As shown in FIG. 2, the suction cup (16) is shown attached to the mounting base (12) with the light assembly (14) shown pivotally attached to the mounting base allowing pivoting when the mounting base and suction cup is placed in a vertical position as shown or rotated in to angular positions up to a horizontal position, not shown. The light assembly includes a reflector base (30) that fits in a curvature section so as to provide a focal reflection point for the LED lights (24) with a transparent lens assembly (32) overlying the LED and reflector.

Figure 4:
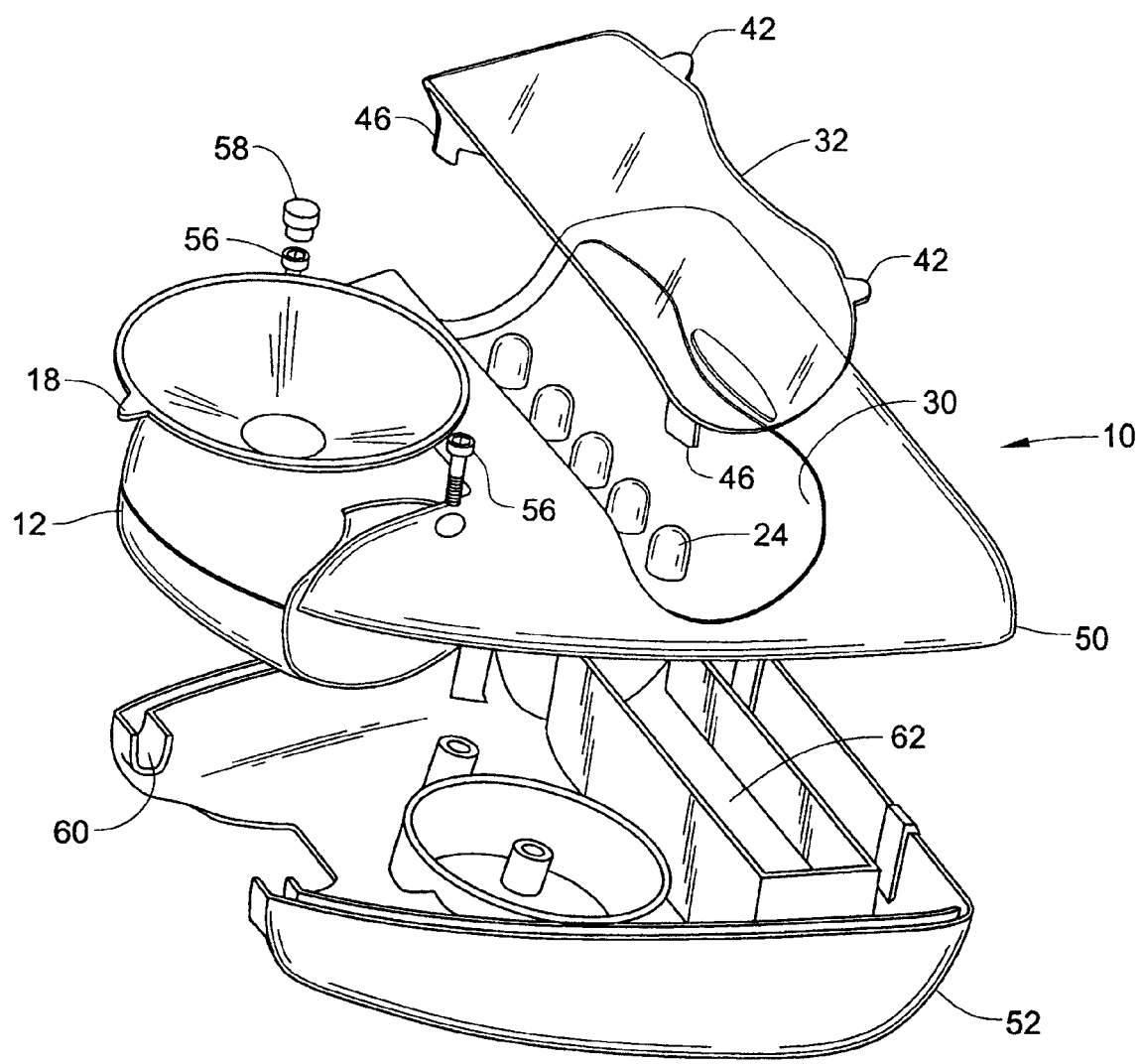
FIG. 4 is an exploded view of the light assembly housing.

The transparent lens may include an optical capability for causing either dispersion or creating a directed focal light from the light emitting diodes. Located along the lower end of the light assembly is positioned batteries (34) located behind a battery cap (36) which provides power to the control circuit (40). The position of the batteries allow the lower end of the light assembly to provide optimal positioning so as to maintain the light assembly in a downward position despite the angular positioning of the mounting base. Now referring to FIG. 4, set forth is an exploded view of the light assembly housing (10) indicating the use of the lens (32) of aligning the LED's (22) and reflector plate (30). The lens (32) can be snapped into place by use of engagement tabs (42) and friction tabs (46). The cover part of the housing (50) is secured to the bottom of the housing (52) by fasteners (56). Fastener covers (58) conceal the fastener for cosmetic purposes. The mounting base (12) is illustrated in attachment to the top base with a pivot location illustrated by numeral (60). A battery holding area (62) is available for receipt of the previously mentioned batteries.

Figure 5:
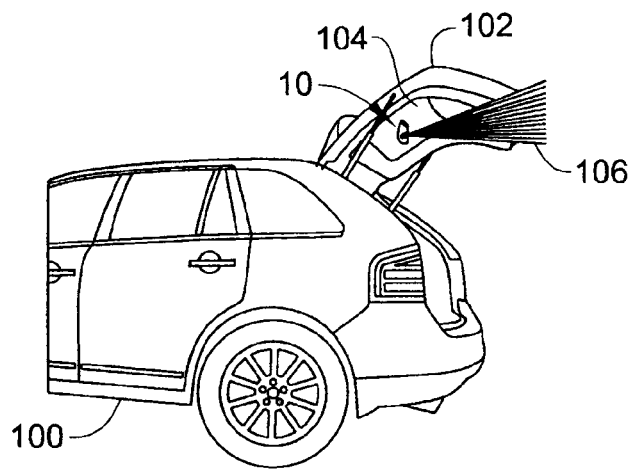
FIG. 5 is a pictorial view of the invention attached to an open hatch.
Figure 6:
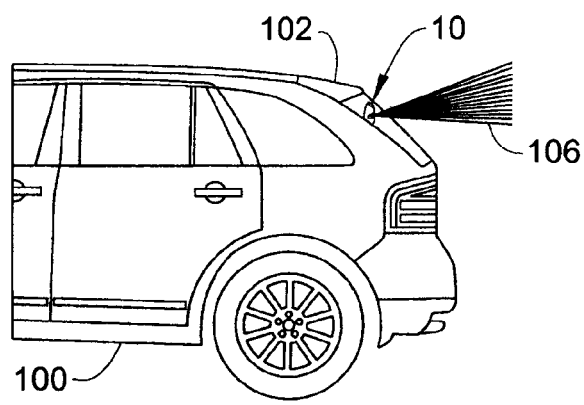
FIG. 6 is a pictorial view of the invention attached to the window of a closed hatch.
Figure 7:
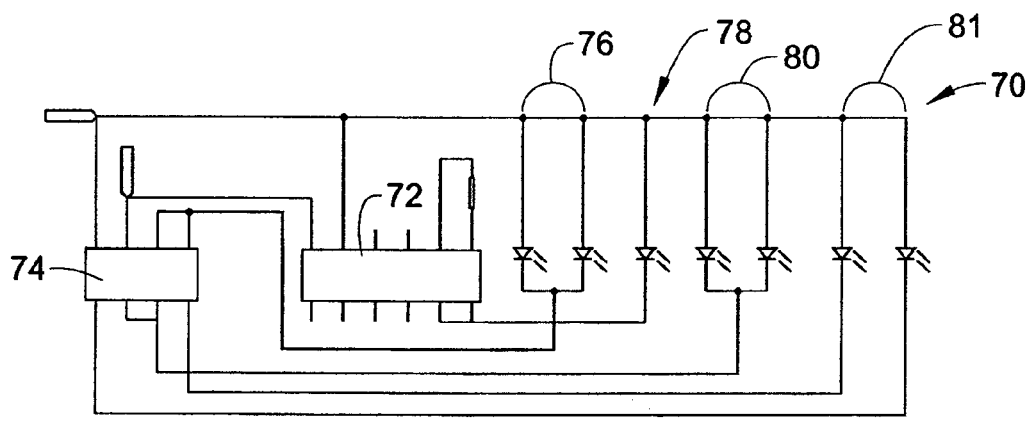
FIG. 7 is an electrical schematic of the circuitry.

Referring now to FIG. 5, set forth is a pictorial of an automobile (100) having a hatch (102) with the self-leveling warning light (10) mounted to the inner surface of the rear window (104). As depicted in FIG. 6, set forth is the automobile (100) having the hatch (102) in a closed position wherein the self-leveling warning light (10) can be shown with a directed view in both FIG. 5 and 6 as being in a horizontal position as indicated by numeral (106). Referring now to FIG. 7, set forth is an electrical schematic indicating the diodes, in this illustration a series of 7 diodes (70). The integrated circuit (72) operates in conjunction with a timer (74) to provide a preferred embodiment wherein a blinking pattern will consist of two red LED's (76), one yellow LED (78) followed by two additional red LED's (80). In this manner the yellow LED is centrally disposed between the two red LED's with the timing circuitry to operate the red LED's to operated on an on and off at a sync rate of approximately 500 MS with the yellow LED turning on for about 750 MS and off for about 1 second.

The red and amber LED's are specifically designed to provide rear facing in a disabled car to alert oncoming traffic by illuminating an emergency flashing sequence. For instance, in the event that a car battery is dead, or if the driver simply wants to conserve battery power during a prolonged roadside breakdown, the device is attached to the rear window of the vehicle. Since the self-leveling warning light is articulated from the mounting base, the lighting device is assured a perfect alignment with the oncoming traffic by always maintaining a perpendicular position to the road. As shown in FIGS. 5 and 6 this is particularly advantages in the case of hatchbacks wherein the rear hatch may be opened to obtain a spare tire and the light will continue to provide the proper emergency signal. The on/off switch (71) LED's (81) provide illumination when the circuit is active mainly when the on/off switch (71) is placed in the on position.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and drawings/figures.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

The invention claimed is:

1. A self leveling warning light for vehicles comprising:
a mounting base having a suction cup for releasably securing to the inner surface of a vehicle window;
a light assembly defined by an upper end and a lower end with a plurality of LEDs positioned therebetween, said upper end of said light assembly pivotedly attached to said mounting base;
a control circuit having a power source mounted within said light assembly and electrically coupled to said LEDs; and
a means for maintaining directional pointing of said LEDs in a horizontal plane when said mounting base is moved between vertical and horizontal orientations, wherein said means for maintaining directional pointing include positioning of batteries along said lower end of said light assembly, said batteries having a weight that causes said lower end to be positioned below said upper end when said mounting base is rotated.

2. The self leveling warning light for vehicles according to claim 1 wherein said light assembly includes a transparent lens cover to protect said LEDs from misalignment.

3. The self leveling warning light for vehicles according to claim 1 wherein said light assembly includes an optical lens for enhancement of directional lighting.

4. The self leveling warning light for vehicles according to claim 1 wherein said light assembly includes a reflector for enhancement of directional lighting.

5. The self leveling warning light for vehicles according to claim 1 wherein said control circuit operates said LEDs in a blinking pattern.

6. The self leveling warning light for vehicles according to claim 5 wherein said control circuit operates said LEDs as a strobe.

7. The self leveling warning light for vehicles according to claim 5 wherein said blinking pattern consists of four red LEDs separated by a centrally located yellow LED, said four red LEDs alternate on and off out at a sync rate of approximately 500 ms and said yellow LED turns on for about 750 ms and off for about 1 second.

8. The self leveling warning light for vehicles according to claim 1 wherein said LED's are positioned on the same side as said mounting base.

9. A self leveling warning light for vehicles comprising:
a mounting base having a suction cup for releasably securing said mounting base to the inner surface of a vehicle window;
a light assembly defined by an upper end and a lower end with a plurality of LEDs positioned therebetween, said upper end of said light assembly pivotedly attached to said mounting base;
a reflector placed adjacent said LED's for enhancement of directional lighting;
an optical lens positioned over said LED's for enhancement of directional lights;
a control circuit having a power source mounted within said light assembly and electrically coupled to said LEDs; and
a means for maintaining directional pointing of said LEDs in a horizontal plane when said mounting base is moved between vertical and horizontal orientations, wherein said means for maintaining directional pointing include positioning of batteries along said lower end of said light assembly, said batteries have a weight that causes said lower end to be positioned below said upper end when said mounting base is rotated.

10. The self leveling warning light for vehicles according to claim 9 wherein said LEDs consists of four red LEDs separated by a centrally located yellow LED, said four red LEDs alternate on and off at sync rate of approximately 500 ms and said yellow LED turns on for about 750 ms and off for about 1 second.

11. The self leveling warning light for vehicles according to claim 9 wherein said control circuit operates said LEDs as a strobe.

* * * * *